INVENTOR.
René Hardy
BY Dean Fairbank & Hirsch
ATTORNEYS

Nov. 16, 1954 R. HARDY 2,694,749

COMMUNICATION SYSTEM

Filed April 18, 1950 2 Sheets-Sheet 2

INVENTOR.
René Hardy
BY Dean Fairbank & Hirsch
ATTORNEYS

United States Patent Office 2,694,749
Patented Nov. 16, 1954

2,694,749

COMMUNICATION SYSTEM

René Hardy, Paris, France, assignor to Sepco 45 B. d'Sebastopol, a corporation

Application April 18, 1950, Serial No. 156,610
4 Claims. (Cl. 179—1)

Figure 1:
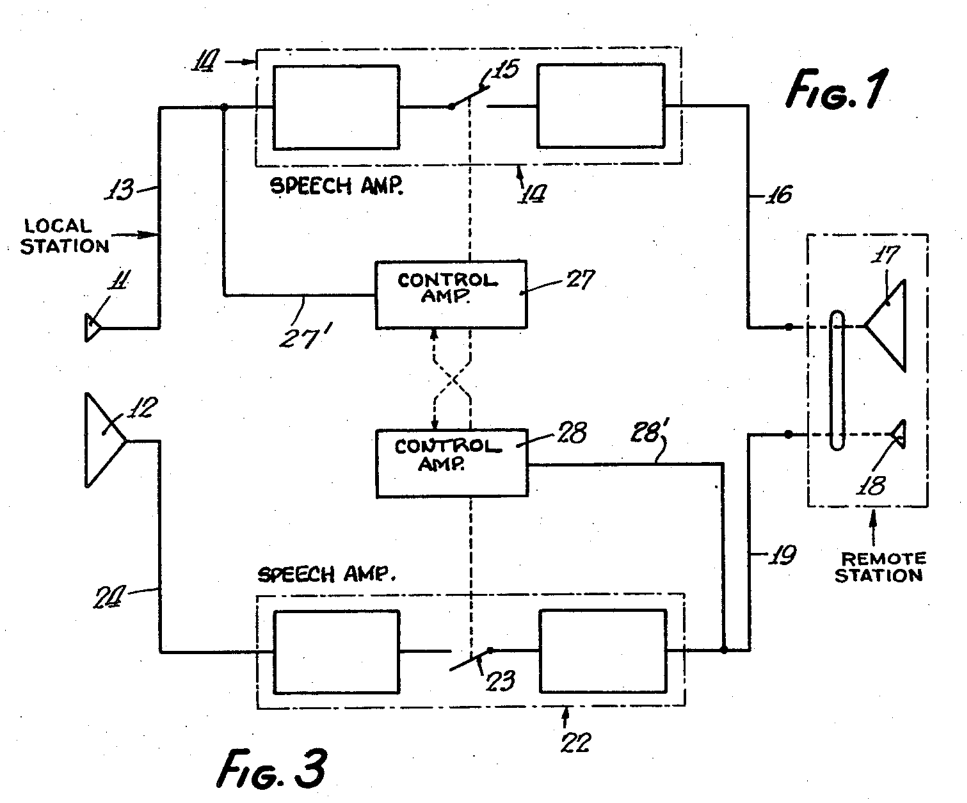

This invention relates to communication systems, more particularly of the type in which objectionable acoustical feed back is prevented.

As conducive to an understanding of the invention, it is to be noted that where, in order to afford communication between a local and remote station, a microphone and speaker are placed near each other at the local station and connected respectively through suitable circuits to a speaker and microphone at a remote station, with each of the respective circuits having amplifying means associated therewith, the level of the sound emitted by the speaker may be raised to any suitable amount. However, as the sounds emitted by the speaker at one station will be picked up by the adjacent microphone and transmitted to the speaker at the other station from which the sounds originated and as the sounds from such speaker will also be picked up by the microphone adjacent thereto, the original sound will be built up as the cycle is repeated, to the limit of the amplifiers. The result is a howl at a frequency for which the over-all system has the most gain. This phenomenon which is known as "acoustic feed-back" will drown out the conversation and will render the installation useless and this is so even when the maximum power of the amplifiers is such as to amplify the sound to a level below that required for normal conversation in a loud voice.

Efforts to prevent "acoustic feed-back" when amplifiers are utilized, by having the microphone at each of the stations normally cut off and require the pressing of a key for it to be used, are unsatisfactory in that it requires an affirmative action on the part of the user each time he speaks and if he should inadvertently fail to press the key when talking into the microphone, no sound would be transmitted.

It is accordingly among the objects of the invention to provide a communication system that will pick up sounds even at a considerable distance from the microphone at one station and amplify such sounds so that they may be heard even at a considerable distance from the speaker at the other station and which will function without "acoustic feed-back" that might render the sounds unintelligible and which does not require the microphone and speaker at the respective stations to be spaced widely apart.

According to the invention, these objects are obtained by the use of a microphone at a local station connected to a speaker at a remote station and a speaker at the local station connected to a microphone at the remote station with a speech amplifier associated with each of the microphone-speaker combinations. Each of the speech amplifiers has a control amplifier associated therewith and so related that only one of the microphone-speaker combinations can be in operation at any one time, a microphone-speaker combination being in operation only when audio frequencies are passing therethrough.

More specifically, according to one aspect of the invention, the speech amplifier associated with each of the microphone-speaker combinations is normally inoperative and is put into operation only when the associated microphone is spoken into, signals from such microphone, through the control amplifier associated therewith, actuating a switch to put the speech amplifier into operation and also insuring that the speech amplifier associated with the other microphone-speaker combination will remain inoperative even if sound should be spoken into the microphone of such latter microphone-speaker combination.

In a specific embodiment herein shown, the speech amplifier associated with each of the microphone-speaker combinations is rendered inoperative by having the cathodes of the amplifying tubes in such speech amplifier floating and not connected to ground. The cathodes of each of the speech amplifiers are connected respectively to one of the fixed contacts of a pair of relays, the movable switch arms of said relays being normally spaced from said fixed contacts and connected to ground. The other fixed contact of each of said relays which are normally engaged by the movable switch arms respectively, are connected to the cathodes of the control amplifiers associated with said speech amplifiers; the last named fixed contact of the relay associated with one of said speech amplifiers being connected to the cathodes of the control amplifier associated with the other of said speech amplifiers and vice versa. The relays are connected through suitable circuits respectively to each of said control amplifiers so that when one of said control amplifiers and its associated speech amplifier are energized the associated relay will be actuated to cut off the other speech amplifier.

According to another aspect of the invention, the speech amplifier associated with each of the microphone-speaker combinations is normally inoperative and is put into operation only when the associated microphone is spoken into, the signals from such microphone through the control amplifier associated therewith, creating a positive potential which is applied to the plate of the associated speech amplifier to energize the latter. A voltage is also applied to the other control amplifier to block the latter so that the speech amplifier associated with the other microphone-speaker combination will remain inoperative even if sound should be spoken into such microphone-speaker combination.

In a specific embodiment herein shown, the speech amplifier associated with each of the microphone-speaker combinations is rendered inoperative by normally having no plate potential, the plate leads of each of said speech amplifiers being connected respectively to the cathodes of normally non-conducting vacuum tubes. By means of resistors in the cathode circuit of such vacuum tubes, when such tubes conduct, the voltage across the resistors will be impressed on the plate of the associated speech amplifier thereby rendering the latter operative. Simultaneously, a blocking potential will be applied to the grid of the input tube of the control amplifier associated with the other speech amplifier to render the latter inoperative.

Figure 3:
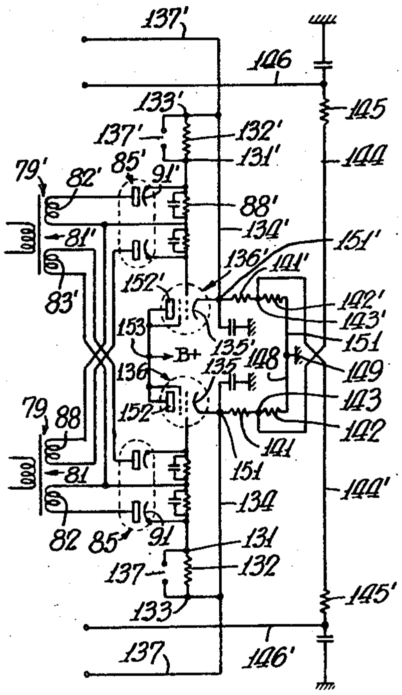
Figure 4:
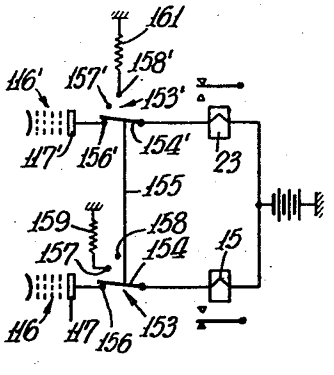
Figure 2:
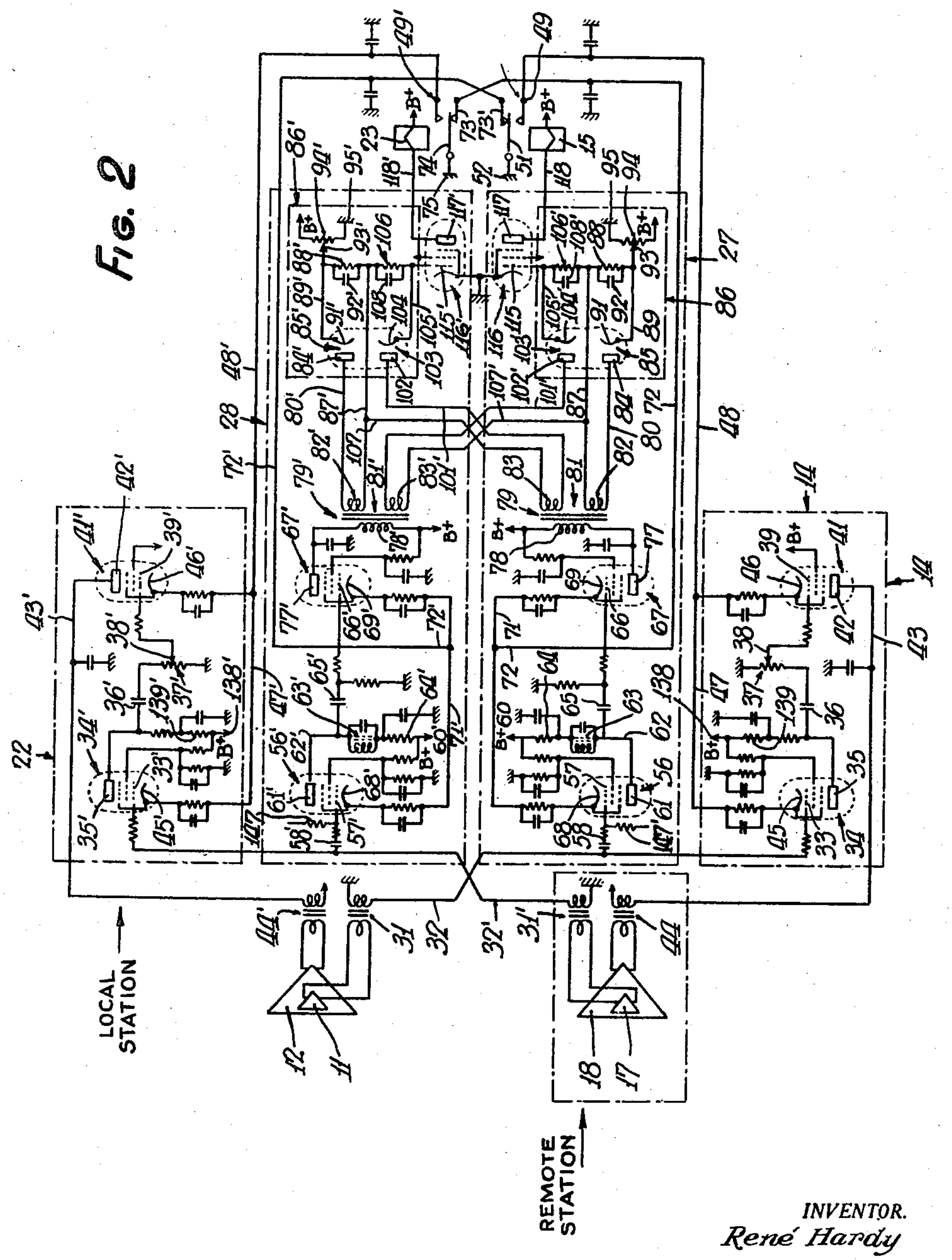

In the accompanying drawings, in which are shown one or more of various possible embodiments of the several features of the invention, Fig. 1 is a block diagram of the communication system diagrammatically illustrating the components thereof, Fig. 2 is a detailed circuit diagram of the communication system shown in Fig. 1, Fig. 3 is another embodiment of the circuit shown in Fig. 2, illustrating an alternative method of blocking and unblocking the speech amplifiers, and Fig. 4 is still another embodiment of the system utilizing a manual switching arrangement.

Referring now to the block diagram of Fig. 1, the system desirably includes a local station, preferably a master station which desirably includes a microphone 11 and a speaker 12, the microphone 11 being connected by lead 13 to the input of a speech amplifier 14 which is normally inoperative, the circuit of such speech amplifier 14 being incomplete as diagrammatically shown by the open switch 15. The output of such speech amplifier 14 is connected by lead 16 to a speaker 17 at a remote station which is illustratively a secondary station having no amplifier units associated therewith.

Similarly, the microphone 18 at the remote station associated with the speaker 17 is connected by lead 19 to the input of a speech amplifier 22 which is also normally inoperative, the circuit of such speech amplifier 22 being incomplete as diagrammatically shown by the open switch 23. The output of such speech amplifier 22 is connected by lead 24 to the speaker 12 at the local station.

Means are desirably provided to actuate the open switches 15 and 23 associated with the speech amplifiers 14 and 22 respectively. To this end, as shown in Fig. 1, control amplifiers 27 and 28 are provided, connected through suitable circuits to switches 15 and 23 respectively.

The various components of the circuit shown in Fig. 1 are so inter-related that, for example, if microphone 11 is spoken into, through lead 27′, the control amplifier 27 will simultaneously close switch 15 to complete the circuit of speech amplifier 14 so that sound may be emitted from the speaker 17 at the remote station and also disable the control amplifier 28 associated with speech amplifier 22 so that there is no likelihood of the sounds emitted by speaker 17 at the remote station being picked up by the adjacent microphone 18 to produce an objectionable acoustic feed back. Similarly, if microphone 18 should first be spoken into, the sound therefrom will be transmitted through speaker 12 at the local station and through lead 28′ the control amplifier 28 associated therewith will disable the control amplifier 27 and speech amplifier 14 associated with microphone 11 at the local station in the manner previously described.

It is apparent therefore, that as only one microphone-speaker combination can be operative at any one time, there is no likelihood of acoustic feed back and the microphone and speaker at such station may be positioned closely adjacent to each other.

As the switching action is automatically controlled by the sound signal, effected by the speech of the parties at each of the stations, in the event that both speakers should start speaking at the same time and with the same intensity of sound, none of the switching actions above described would take place. However, although it is remotely possible that two parties may start speaking together at the same time, it is highly improbable that they will both speak at the same time and with the same intensity and the system is so designed that if there should be simultaneous speech at both the local and remote stations, the person speaking with the louder voice will control.

Referring to Fig. 2 for a detailed analysis of the circuit by means of which the principles of operation of the invention herein are performed, the microphone 11 at the local station is connected through a conventional microphone transformer 31 and lead 32 to the control grid 33 of vacuum tube 34 in the speech amplifier 14. Vacuum tube 34 which, illustratively is a conventional pentode, has its plate 35 connected through coupling condenser 36 to potentiometer 37 and thence through the movable arm 38 of said potentiometer to the control grid 39 of a vacuum tube 41 which also desirably is a pentode. The plate 42 of tube 41 is connected by lead 43 to the speaker transformer 44 of speaker 17 at the remote station. The cathodes 45 and 46 of tubes 34 and 41 are connected together by lead 47 and thence by lead 48 to the fixed contact 49 of switching relay 15. As the movable contact arm 51 of such relay, which is connected to ground as at 52, is normally spaced from fixed contact 49, it is apparent that the cathodes 45 and 46 of tubes 34 and 41 of speech amplifier 14 will be "floating" and hence the speech amplifier 14 will be inoperative.

Associated with the speech amplifier 14 is the control amplifier 27 which, as shown in Fig. 2, has an input tube 56, illustratively a pentode, the control grid 57 of which is connected through coupling capacitor 58 to lead 32. The tube 56, which functions as a normal pentode amplifier tube, has its plate 61 connected by lead 62 to a wave trap circuit or filter 63 in series with such plate 61 and with a plate load resistor 64, the free end of which is connected to B+ as at 60. This filler 63 preferably is tuned so as to pass a frequency between one thousand and two thousand cycles per second, eliminating the very low and very high audio frequencies. The plate 61 of tube 56 is also connected through coupling capacitor 65 to the control grid 66 of an amplifier tube 67, which is also illustratively a pentode connected in conventional manner. The cathodes 68 and 69 of tubes 56 and 67 respectively, are connected together by lead 71 and then connected by lead 72 to the fixed contact 73 of switching relay 23, which fixed contact is normally engaged by the movable contact arm 74 of said relay, the latter being connected to ground as at 75.

It is apparent that with the circuit of the control amplifier 27 thus far described, the latter will normally be in operative condition ready to amplify the audio signal impressed upon the grid 57 of the input tube 56 from the microphone 11.

The plate 77 of tube 67 of control amplifier 27 is connected to one side of the primary 78 of transformer 79, the other side of said primary being connected to B+. The secondary 81 of transformer 79 desirably has a pair of windings 82 and 83 desirably having the same number of turns. One side of the winding 82 is connected by lead 80 to the plate 84 of a diode 85 which forms part of a differential detector 86. The other side of the winding 82 is connected by lead 87 to one side of resistor 88, the other side of said resistor being connected by lead 89 to the cathode 91 of diode 85, a capacitor 92 being shunted across said resistor 88. The cathode 91 is also connected to the movable arm 93 of a potentiameter 94, one side of which is connected to ground as at 95 and the other side of which is connected to B+.

As the microphone 17 at the remote station is connected to the speech amplifier 22 and control amplifier 28 in the identical manner to that which microphone 11 at the local station is connected to the speech amplifier 14 and control amplifier 27 and as the components of the speech amplifier 22 and control amplifier 28 are identical to those of speech amplifier 14 and control amplifier 27, they will not be described and parts of speech amplifier 22 and control amplifier 28 corresponding to those of speech amplifier 14 and control amplifier 27 will have the same reference numerals primed.

Referring again to Fig. 2, one side of the winding 83 of the secondary 81 is connected by lead 101 to the plate 102 of the diode 103 which forms part of the differential detector 86′. The cathode 104 of diode 103 is connected by lead 105 to one side of a resistor 106, desirably shunted by a capacitor 108, the other side of said resistor being connected by leads 87′ and 107 to the other side of the winding 83. In like manner one side of the winding 83′ of secondary 81′ of transformer 79′ is connected by lead 101′ to the plate 102′ of diode 103′ which forms part of the differential detector 86. The cathode 104′ of diode 103′ is connected by lead 105′ to one side of resistor 106′ also desirably shunted by a capacitor 108′, the other side of said resistor being connected by lead 87 and 107′ to the other side of the winding 83′ of secondary 81′.

The cathode 104′ of tube 103′ and the adjacent end of resistor 106′ is connected to the control grid 115 of control vacuum tube 116, preferably a conventional pentode amplifier. The plate 117 of said tube 116 is connected by lead 118 to one side of coil of relay 15, the other side of said coil being connected to B+. Similarly, the cathode 104 of tube 103 and the adjacent end of resistor 106 is connected to the control grid 115′ of control vacuum tube 116′, also preferably a conventional pentode amplifier, the plate 117′ of said tube being connected by lead 118′ to one side of the coil of relay 23, the other side of said coil being connected to B+.

The operation of the system thus described may be briefly summarized as follows: Referring to Fig. 2, as soon as one speaks into local microphone 11 the signal therefrom will be fed from microphone transformer 31 through lead 32 to the control grid 57 of tube 56 of the control amplifier 27 and also to the control grid 33 of tube 34 of the speech amplifier 14. By reason of the fact that the cathode 45 of tube 34 is not grounded, inasmuch as leads 47 and 48 connected thereto go to the contact 49 which is not yet engaged by the grounded movable switch arm 51, the speech amplifier 14 will not be operative.

The control amplifier will be operative immediately upon impression of a signal upon grid 57 of tube 56 thereof by reason of the fact that the cathodes 68 and 69 of tubes 56 and 67 are connected by leads 71 and 72 to fixed contact 73 which is normally engaged by grounded movable contact arm 74. The output of tube 56 after being filtered by wave trap 63 will be further amplified by tube 67 and fed to the primary 78 of transformer 79. The alternating signal induced in the secondary winding 82 of transformer 79 will be detected by diode 85 and a rectified signal, filtered by condenser 92 will be developed across resistor 88. This signal being positive in direction and being impressed upon the control grid 115 of control tube 116 will cause such tube to conduct strongly. The current through such tube will pass through the coil of relay 15 thereby energizing such coil and causing the movable switch arm 51 of relay 15 to disengage fixed contact 73′ and engage fixed contact 49. Thus, the cathodes 45 and 46 of tubes 34 and 41 of speech amplifier 14 will now be connected to ground through leads 47 and 48, fixed contact 49 and movable switch arm 51. As a result the speech amplifier 14 will amplify the signal impressed upon the control grid 33 of tube 34 and the output of the speech amplifier 14 will be impressed on the speaker 17 at the remote station.

Substantially simultaneously with the actuation of speech amplifier 14, the disengagement of switch arm 51 from fixed contact 73′ will remove the ground return for the cathodes 68′ and 69′ of tubes 56′ and 67′ of control amplifier 28 thereby rendering said control amplifier 28 inoperative and insuring that the speech amplifier 22 associated therewith will not be put into circuit by reason of its normally ungrounded cathodes 45′ and 46′. Consequently there is no likelihood of "acoustic feed back" being developed by the sounds that would, in the absence of the present invention, be picked up by the remote microphone 18.

At the same time that an alternating signal is developed across the winding 82 of transformer 79, a similar signal will be developed across the winding 83 of such transformer. This latter signal will be impressed on the diode 103 of differential amplifier 86′, and a rectified voltage will be developed across the resistor 106 filtered by condenser 108. As such rectified voltage across resistor 106 is negative in direction, it will tend to make the control grid 115′ of control tube 116′ negative and hence such tube will not conduct, with the result that no current will flow therethrough nor through the coil of relay 23. Hence, the movable contact arm 74 of such relay will remain in engagement with fixed contact 73 to maintain the ground return for the cathodes 68 and 69 of tubes 56 and 67.

It is apparent that if a person at the remote station should attempt to speak into the microphone 17 at the same time that sound is being emitted from the remote speaker 18, as the speech amplifier 22 associated with microphone 17 will not be operative, the person speaking at the remote station will not be able to be heard at the local station through speaker 12, and he must wait until the speaker at the local station is finished. At this time by reason of the fact that no current will flow through the control amplifier 27 and hence through the coil of relay 15, the movable contact arm 51 thereof will move back into engagement with fixed contact 73′ and away from fixed contact 49 so that the circuit will be in its original condition as shown in Fig. 2.

If the person at the remote station now wishes to reply to the person at the local station who just finished his conversation, he need merely speak into the remote microphone 17. As the operation of the system with the remote microphone 17 energized is identical with the operation of the system with the local microphone 11 energized as above described, no further explanation therefore is deemed necessary.

The operation of the system has been described under the condition where a person at one station speaks before a person at the other station. Where persons at the local and remote stations speak simultaneously, as the input to each of the differential detectors 86 and 86′ would be equal and opposite in phase, they would cancel each other and hence the system would be inoperative. However, such a condition is only remotely possible and it is even more improbable that the two persons will speak with the same intensity or loudness, and the system is designed so that the person speaking in the louder voice will take over. That is, the speech amplifier and control amplifier associated with the microphone into which such person is speaking will be in circuit and operative and the other speech amplifier and control amplifier will be inoperative so that there is no likelihood of acoustic feed back.

Thus, as shown in Fig. 2 when, for example, the person with the louder voice speaks into microphone 11, a positive voltage will be developed across resistor 88 in the differential detector 86 and a negative voltage will be developed across the resistor 106 in the differential detector 86′. At the same time, as the result of the signal into microphone 17, a positive voltage will be developed across resistor 88′ in differential detector 86′ and a negative voltage will be developed across resistor 106′ in the differential detector 86.

As the signal into microphone 11 is of greater intensity than that into microphone 17, the positive voltage across resistor 88 will be greater than the negative voltage across resistor 106′ and the resultant voltage impressed upon the control grid 115 of control tube 116 will be positive and such tube will conduct to send current through the coil of relay 15 to energize the latter in the manner heretofore set forth. As the negative voltage across resistor 106 of differential detector 86′, will be greater than the positive voltage across resistor 88′ due to the greater intensity of the signal from the microphone 11, the resultant voltage impressed upon the control grid 115′ of control tube 116′ will be negative and hence such tube will not conduct and relay 23 will not be energized. Consequently, but one microphone-speaker combination will be in circuit and no acoustic feed back will occur.

It is to be understood that the circuits herein described could be incorporated in a system in which the local station is a master station, as shown, having amplifiers associated therewith and having a number of remote stations connected to the local station, which remote stations may also be master stations having their own amplifiers or secondary stations as shown herein without amplifiers. In such a system it is desirable that the user at the local station be able to call one or more of the remote stations with but a few simple manual operations before starting the conversation and thereafter hold a confidential conversation with the remote stations. It is also desirable that either the secondary or master remote stations be able to call the local master station and that such conversation also may be limited by the local master station to only itself and the station calling.

Although any suitable switching arrangement may be used for this purpose, it is preferred to use the arrangement shown and described in my co-pending application Serial No. 144,260, filed February 15, 1950.

In Fig. 3 is shown another embodiment of the invention whereby one microphone-speaker combination can be put into circuit and the other microphone-speaker combination disabled so that acoustic feed back is prevented. To this end the circuit shown in Fig. 2 is modified to ground the cathodes of the tubes in the speech amplifiers 14 and 22 and the control amplifiers 27 and 28 and to change the components associated with the outputs of the differential detectors 86 and 86′ as shown in Fig. 3.

Thus the cathode 91 of diode 85 is connected to end 131 of resistor 132, the other end 133 of which is connected by lead 134 to the cathode of a control vacuum tube 136, illustratively a tetrode although a triode or pentode could be used. Desirably a voltage is applied as at 137 across resistor 132 to serve as a return for the cathode 135 of control tube 136. End 133 of resistor 132 is connected by lead 137 to the end 138 of the plate load resistor 139 of tube 34 in speech amplifier 14, which resistor for this purpose is disconnected from the B+ supply to which it is connected when the circuit operates as shown in Fig. 2. The cathode 135 of control tube 136 as shown in Fig. 3 is connected in series with a pair of resistors 141 and 142 center tapped as at 143 and connected at this point by lead 144 to one side of resistor 145 and from the other side of resistor 145 by lead 146 to one side of the resistor 147, the other side of which is connected to the grid 57′ of tube 56′ in control amplifier 28. The free end of resistor 142 shown in Fig. 3 is connected by lead 148 to ground as at 149 and by lead 151 to the free end of resistor 142′ which is connected in series with resistor 141′, the other end of the latter resistor being connected to the cathode 135′ of control tube 136′ which is desirably identical to control tube 136.

As shown in Fig. 3, the plates 152, 152′ of control tubes 136 and 136′ are connected together by lead 153 which is in turn connected to the B+ supply. The cathode 91′ of diode 85′ is connected to one end 131′ of resistor 132′, the other end 133′ of which is connected by lead 134′ to the cathode 135′ of control vacuum tube 136′. Desirably a voltage is applied as at 137′ across resistor 132′ to serve as a return for the cathode 135′ of control tube 136′. End 133′ of resistor 132′ is connected by lead 137′ to the end 138′ of the plate load resistor 139′ of the tube 34′ in speech amplifier 22, which resistor for this purpose is also disconnected from the B+ supply to which it is connected when the circuit operates as shown in Fig. 2. The resistors 141′ and 142′ in series with the cathode 135′ of control tube 136' shown in Fig. 3 are center tapped as at 143' and connected at this point by lead 144' to one side of resistor 145' and from the other side of resistor 145' by lead 146' to one side of the resistor 147', the other side of which is connected to the grid 57 of tube 56 in the control amplifier 27.

The operation of the circuit of Fig. 2 as modified by the circuit of Fig. 3 is quite similar to that of the circuit of Fig. 2 alone.

Thus in the absence of a signal into the microphone 11 or 17, control tubes 136 and 136', shown in Fig. 3 will not conduct and consequently speech amplifiers 14 and 22 will be inoperative. When one of the microphones, illustratively microphone 11 is spoken into, current will flow through control tube 136 shown in Fig. 3 and consequently a positive potential will be developed at point 151 which, through leads 134 and 137, will be impressed upon the plate 35 of tube 34 in speech amplifier 14. At the same time the voltage developed across resistor 142 will be impressed through leads 144 and 146 on one end of the resistor 147, the other end of which is connected to the grid 57' of tube 56' shown in Fig. 2 to block the action of such tube. Consequently, if a person should speak into microphone 11, no signal will be transmitted through the control amplifier 28 and hence no voltage will be developed across resistors 141' and 142', shown in Fig. 3, which is required in order that a positive potential may be applied to the plate 35' of speech amplifier 22 in order that it may function. Consequently, there is no likelihood of acoustic feed back.

As the operation of the circuit of Fig. 3, when microphone 17 is first spoken into and when both microphones 11 and 17 are simultaneously spoken into with a louder signal in one of said microphones, is apparent from the description herein it will not be described.

The use of the circuits above-described which permit automatic switching does not exclude the possibility of also incorporating in the circuit a manual switching arrangement. To this end as shown in Fig. 4 the control tubes 116 and 116' shown in Fig. 2 are connected from their plates 117, 117' respectively, to the relays 15 and 23 by means of three-position switches 153, 153', said switches each having a movable switch arm 154, 154' ganged as at 155 to move in unison and adapted to engage any one of the three contacts 156, 156'; 157, 157' and 158, 158' respectively, associated therewith. Except for the interposition of the switches 153 and 153', as shown in Fig. 4 the circuit of Fig. 2 is not otherwise modified. When the switch arms 154, 154' are engaging the contacts 156 and 156' respectively, the modified circuit will function exactly as described with respect to the circuit shown in Fig. 2. When movable contact arms 154, 154' are engaging contacts 157, 157' one of which, illustratively contact 157' is floating and out of circuit and the other of which, i. e., contact 157 is connected through resistor 159 to ground, relay 15 will be energized and hence the speech amplifier 14 associated therewith will be rendered operative and the speech amplifier 22 disabled. As a result the remote station can only function as a listening station to receive communication from the local station. Similarly, when the movable contact arms 154, 154' shown in Fig. 4 are in the third position engaging contacts 158 and 158' respectively, one of which, illustratively contact 158' is connected through resistor 161 to ground and the other of which, i. e. contact 158 is floating and out of circuit, relay 23 will be energized and hence the speech amplifier 22 associated therewith will be rendered operative and the speech amplifier 14 disabled. As a result the local station can only function as a listening station to receive communication from the remote station.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A communication system having two stations each having a speech amplifier and a control amplifier, each of said amplifiers having an output stage with a vacuum tube having a cathode and an input stage with a vacuum tube, means for connecting a microphone to the input stage of the speech amplifier and control amplifier at each station, means for connecting a speaker to the output of each of the speech amplifiers at each station, a relay associated with the control amplifier at each station, each of said relays comprising a coil, a pair of spaced fixed contacts and a movable arm controlled by said coil and connected to ground, said movable arm normally engaging one of the fixed contacts of the associated pair of contacts, the engaged fixed contact of each of said relays being connected to the cathode of the control amplifier associated with the other relay, and the other fixed contact of each of said relays being connected to the cathode of the vacuum tube in the output stage of the associated speech amplifier, a transformer in the output of each of said control amplifiers, said transformers each having a pair of secondary windings, a differential detector comprising a pair of diodes in circuit with each of said control amplifiers, a pair of resistors shunted across the cathodes of each pair of diodes, means connecting one end of one of the secondary windings of the transformers of each of said control amplifiers to the plate of one of the diodes of each of said associated differential detectors, means connecting the other end of said secondary winding of each of said transformers to the junction between each pair of resistors respectively, means connecting one end of the other of the secondary windings of each of said transformers to the plate of the other diode of the other of said differential detectors and means connecting the other end of said secondary winding of each of said transformers to the junction between the resistors of the other differential detector, whereby the output of each of said control amplifiers may be fed both to the associated differential detector and to the other differential detector and means controlled by the voltage developed across the resistors associated with each of said differential detectors to energize the coils of the relay associated respectively with the control amplifier at each station, whereby when one of the microphones is energized the output of the associated control amplifier will energize the associated relay to connect the cathode of the associated speech amplifier to ground to energize such speech amplifier and to break the circuit to the cathode of the other control amplifier to de-energize the latter.

2. The combination set forth in claim 1 in which the means controlled by the voltage developed across the resistors associated with each of said differential detectors comprises a pair of control vacuum tubes associated respectively with each of said differential detectors, said vacuum tubes being normally inoperative and having their grids connected to the associated resistors whereby upon development of a positive potential on said grids, said tubes will be rendered operative.

3. The combination set forth in claim 1 in which a switch is associated with each of said relays and its associated control vacuum tube, said switches each having a movable contact arm ganged together to move in unison, said movable contact arms being connected at one end to the coil of the associated relay, each of said switches having three contacts, the first of said contacts of each of said switches being connected to the plate of the associated control vacuum tube, the second contact of one of said switches being connected to ground and the second contact of the other of said switches being dead, the third contact of said first-named switch being dead and the third contact of said second-named switch being connected to ground, whereby when said movable contact arms engages the first contacts of said switches both of said relay coils will be in series with the associated control vacuum tubes, when said movable contact arms engage the second contacts of said switches the relay associated with said first switch will be actuated and the relay associated with the second switch will be inoperative and when said movable contact arms engage the third contacts of said switches the relay associated with said first switch will be inoperative and the relay associated with said second switch will be operative.

4. A communication system having two stations each having a speech amplifier and a control amplifier, each of said amplifiers having an output stage with a vacuum tube having a cathode and an input stage with a vacuum tube having a grid, means for connecting a microphone to the input stage of the speech amplifier and control amplifier at each station, means for connecting a speaker to the output of each of the speech amplifiers at each station, a transformer in the output of each of said control amplifiers, said transformers each having a pair of secondary windings, a differential detector comprising a pair of diodes in circuit with each of said control amplifiers, a pair of resistors shunted across the cathodes of each pair of diodes, means connecting one end of one of the secondary windings of the transformers of each of said control amplifiers to the plate of one of the diodes of each of the associated differential detectors, means connecting the other end of said secondary winding of each of said transformers to the junction between each pair of resistors respectively, means connecting one end of the other of the secondary windings of each of said transformers to the plate of the other diode of the other of said differential detectors and means connecting the other end of said secondary winding of each of said transformers to the junction between the resistors of the other differential detector, whereby the output of each of said control amplifiers may be fed both to the associated differential detector and to the other differential detector, a pair of resistors in series with the cathodes of each of said control vacuum tubes, the free ends of said resistors being connected together and having a common ground, a lead connecting the cathode of each of said control vacuum tubes to the plate of one of the input tubes in the associated speech amplifier and a lead connecting the junction between said resistors associated with one of said differential detectors with the grid of one of the tubes in the control amplifier associated with the other of said differential detectors, whereby when said control vacuum tube conducts, a voltage will be developed across the resistors in the cathode circuit thereof and a positive potential will be applied to the plate of the associated speech amplifier to render the latter operative and a blocking potential will be applied to the grid of the control amplifier associated with the other speech amplifier to render such control amplifier inoperative.

References Cited in the file of this patent

UNITED STATES PATENTS

| Number | Name | Date |
|---|---|---|
| 1,773,776 | Crisson | Aug. 26, 1930 |
| 2,102,903 | Leveque | Dec. 21, 1937 |
| 2,129,990 | De Fremery | Sept. 13, 1938 |
| 2,205,142 | Hoard | June 18, 1940 |
| 2,352,711 | Hasenberg | July 4, 1944 |
| 2,369,351 | Herrick | Feb. 13, 1945 |
| 2,424,069 | Tschumi | July 15, 1947 |
| 2,545,467 | Jeanlin | Mar. 20, 1951 |
| 2,545,476 | Levy | Mar. 20, 1951 |
| 2,545,477 | Levy | Mar. 20, 1951 |